(12) United States Patent
Gilman

(10) Patent No.: US 7,035,517 B2
(45) Date of Patent: Apr. 25, 2006

(54) INTEGRATED DEMULTIPLEXER/PHOTORECEIVER FOR OPTICAL NETWORKS AND METHOD OF CONTROLLING TRANSPARENCY OF OPTICAL SIGNAL TRANSMISSION LAYER

(75) Inventor: Boris Gilman, 436 Sierra Vista Ave. #8, Mountain View, CA (US) 94043

(73) Assignee: Boris Gilman, Mountain View, CA (US)

( * ) Notice: Subject to any disclaimer, the term of this patent is extended or adjusted under 35 U.S.C. 154(b) by 267 days.

(21) Appl. No.: 10/703,362

(22) Filed: Nov. 10, 2003

(65) Prior Publication Data
US 2005/0100272 A1  May 12, 2005

(51) Int. Cl.
G02B 6/134 (2006.01)
H04B 10/06 (2006.01)

(52) U.S. Cl. ......................... 385/131; 398/214
(58) Field of Classification Search ..................... None
See application file for complete search history.

(56) References Cited

U.S. PATENT DOCUMENTS

| 5,689,122 A | 11/1997 | Chandrasekhar |
| 6,804,444 B1 * | 10/2004 | Shin et al. ................. 385/131 |
| 2003/0021549 A1 * | 1/2003 | Chason et al. ............. 385/88 |

OTHER PUBLICATIONS

"Understanding Optical Communications", by H.J.R. Dutton, 1998.
"Electronics Letters", vol. 35, No. 15, pp. 1248-1249.

* cited by examiner

Primary Examiner—John D. Lee
Assistant Examiner—Jerry T. Rahll

(57) ABSTRACT

An integrated demultiplexer/photoreceiver (IDP) for optical networks and optical interconnection devices has a common substrate which supports three sequentially arranged basic components: a waveguide grating router, an array of photodetectors, and an array of heterojunction transistors. Basic layers of all three components are grown together in a common epitaxial process, and then each of the components is individually patterned in accordance with its function. Such structure of IDP makes it possible to reduce the cost, simplify the design, improve conditions for optical alignment, and reduce optical losses. In accordance with one embodiment of the invention, transparency of the optical signal transmission layer of the WGR is controlled by selectively doping the layers of the multiple-layer waveguide structure, while in another embodiment such control is achieved by changing the width of the energy gap in the optical signal transmission layer of the WGR. Such a change is achieved by utilizing electrical bias and optical pumping from an external light source operating on a predetermined wavelength. The invention also provides a method for controlling transparency of the layer that transmits optical signals through the waveguide units in optoelectronic devices, such as an integrated demultiplexer/photoreceiver for optical network, by utilizing optical pumping and electrical bias.

29 Claims, 12 Drawing Sheets

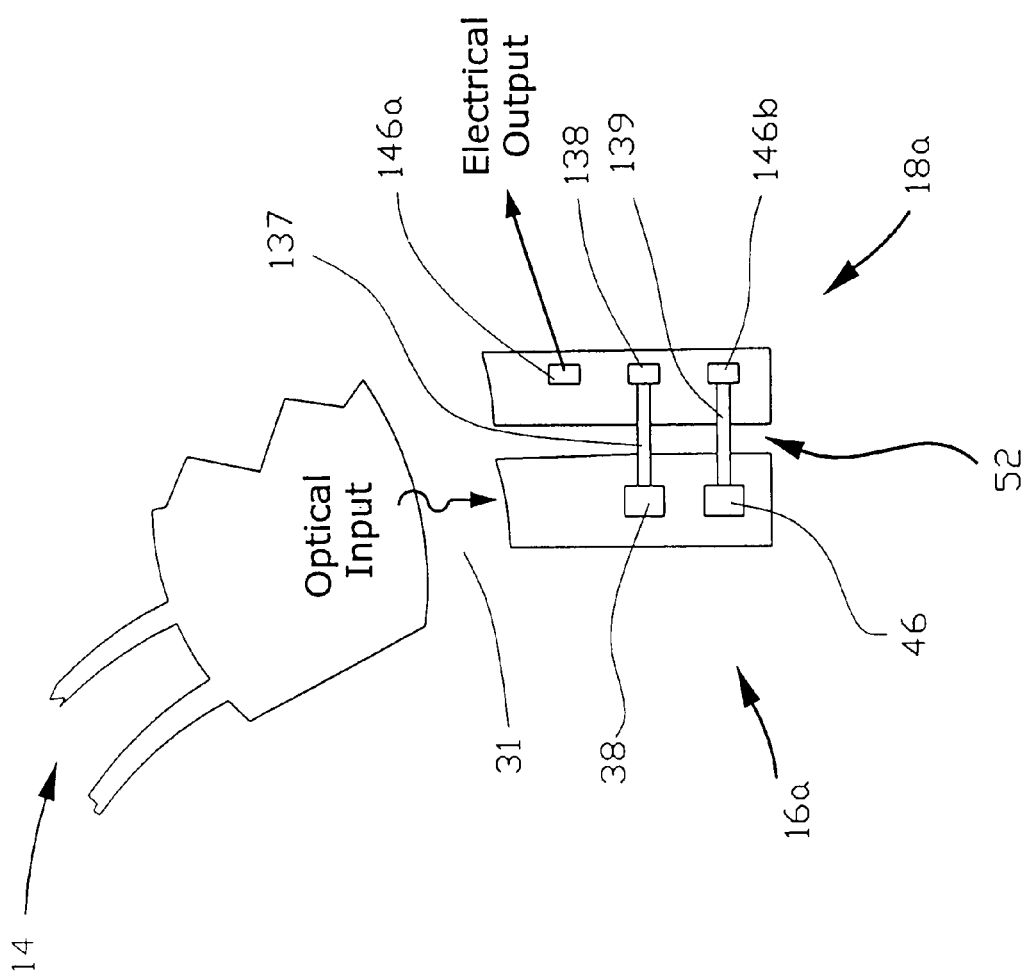

INTEGRATED DEMULTIPLEXER/PHOTORECEIVER FOR OPTICAL NETWORKS AND METHOD OF CONTROLLING TRANSPARENCY OF OPTICAL SIGNAL TRANSMISSION LAYER

TECHNICAL FIELD

The present invention relates to semiconductor devices, and in particular, to integrated demultiplexer/photoreceiver for optical networks and optical interconnection devices which incorporate demultiplexers in the form of wave-guide grating routing (WGR) devices, photodetectors for converting optical signals into electrical signals, and electric signals amplifiers in the form of transistors. The invention also relates to a method of controlling transparency of an optical signal transmission layer in optical signal transmission devices.

BACKGROUND OF THE INVENTION

At the present time, wavelength division multiplexing (WDM) optical networks (ON) and various optical interconnecting devices (OID) represent one of the fastest growing fields of technology. Among other components, a typical WDM ON incorporates a wavelength demultiplexer, which discriminates and spatially separates individual optical channels, an array of photodetectors for converting optical signals of the individual optical channel into appropriate electrical signals, and amplifiers for amplifying the detected electrical signals for further data processing or data transmission.

In accordance with the existing practice, the aforementioned three components of an WDM ON are independently manufactured and assembled into a photoreceiving unit. Such systems are described, e.g., in "Understanding Optical Communications" by H. J. R. Dutton, 1998. A disadvantage of a photoreceiving unit assembled from three prefabricated devices is that it is large in size, expensive to manufacture, requires assembling operation, involves optical losses, makes it difficult to provide optical alignment, and is limited with regard to the number of optical channels. This is because an increase in the number of optical channels leads to rapid increase in cost and manufacturing complexity.

Attempts have been made to integrate some of aforementioned components into a monolithic optoelectronic integrated circuit (OEIC). Such a circuit is described, e.g., in: "Electronics Letters", Vol. 35, No. 15, pp. 1248–1249. The device consists of a common substrate, which supports two individually manufactured components, such as a grating-type demultiplexer and an InGaAs photodetector array having individual photodetectors aligned with respective optical outputs of the demultiplexer. Since the aforementioned two components, i.e. the grating-type demultiplexer and the InGaAs photodetector array, are formed by growing and patterning on a common substrate, they partially solve the problems associated with optical losses and optical misalignment. Another advantage is that integration makes a tremendous step towards miniaturization.

However, the device described in the above reference still has a number of disadvantages such as absence of an amplifier in the form of an integrated component, channel cross-talk, and difficulties in manufacture associated with the formation of grating structures inside a grown semiconductor layer. It is also difficult to form a photodetector array accurately aligned with optical outputs.

The above problems can be partially solved by means of a device described in U.S. Pat. No. 5,689,122 issued in 1997 to S. Chandrasekhar. This device relates to a monolithic integrated demultiplexing photoreceiver that is formed on a semi-insulating InP substrate. A WGR unit of the device is formed on a common substrate and includes a first plurality of InP/InGaAs semiconductor layers. At least one p-i-n photodiode is separately formed on the same substrate and includes a second plurality of InP/InGaAs semiconductor layers. Additionally, at least one single heterostructure bipolar transistor is also separately formed on the same substrate and includes a third plurality of InP/InGaAs semiconductor layers. Two layers from each of the first, second and third plurality of layers are identical to one another. All three components are grown sequentially on the substrate, each in its individual process. In the photodetector, an electron-hole separating n-p plane is located parallel to the light propagation direction and is spaced from an optical signal transmission layer i.e. light waveguiding layer of WGR.

Thus, although all three aforementioned components, i.e., a WGR demultiplexer, a photodetector, and amplifier, are integrated on a common substrate, each of them has an individual layered structure different from the layered structure of other components. The manufacturing process is complicated, difficult to control, may have low repeatability, and is expensive as it requires three separate sequential manufacturing stages, one for each component. What is most important from the performance point of view is that the aforementioned position of the separating n-p plane parallel to the light propagation direction results in low optical coupling efficiency due to the fact, that, in order to reach the aforementioned plane or it vicinity, the light should change its direction by 90 degrees. This may result in significant light power losses at the photodetecting stage.

SUMMARY OF THE INVENTION

An integrated demultiplexer/photoreceiver (IDP) for optical networks and optical interconnection devices has a common substrate which supports three sequentially arranged basic components: a waveguide grating router, an array of photodetectors, and an array of heterojunction transistors. All layers of all three components are grown together in a common epitaxial process, and then each of the components is individually patterned in accordance with its function. Such structure of IDP makes it possible to reduce the cost, simplify the design, improve conditions for optical alignment, and reduce optical losses. In accordance with one embodiment of the invention, transparency of the optical signal transmission layer of the WGR is controlled by selectively doping the layers of the multiple-layer waveguide structure, while in another embodiment such control is achieved by utilizing electrical bias and optical pumping from an external light pumping source operating on a predetermined wavelength. The invention also provides a method for controlling transparency of the layer that transmits optical signals through the waveguide units in optoelectronic devices, such as an integrated demultiplexer/photoreceiver for optical network, by utilizing optical pumping and electrical bias.

OBJECTS OF THE INVENTION

It is an object of the present invention to provide an integrated demultiplexer/photoreceiver for optical networks and optical interconnection devices which is simple in construction, inexpensive and simple to manufacture, can be produced in a single manufacturing process for all basic components, characterized by reduced optical losses, and facilitates optical alignment. The invention also provides a method for manufacturing the aforementioned demultiplexer/photoreceiver, which is simple, inexpensive, and may require a fewer number of steps than known methods. Another object is to provide control of transparency in the optical signal transmission layer of WGR by selectively doping the multiple-layer structure of the WGR. Still another object is to provide control of transparency in the optical signal transmission layers of devices, such as WGR, by utilizing electrical bias and optical pumping with the use of a light pumping source operating on a predetermined wavelength.

BRIEF DESCRIPTION OF THE DRAWINGS

FIG. 4 is a partial top view similar to FIG. 1 illustrating gaps and electrical connections between the basic components.

DETAILED DESCRIPTION OF THE INVENTION

Figure 1:
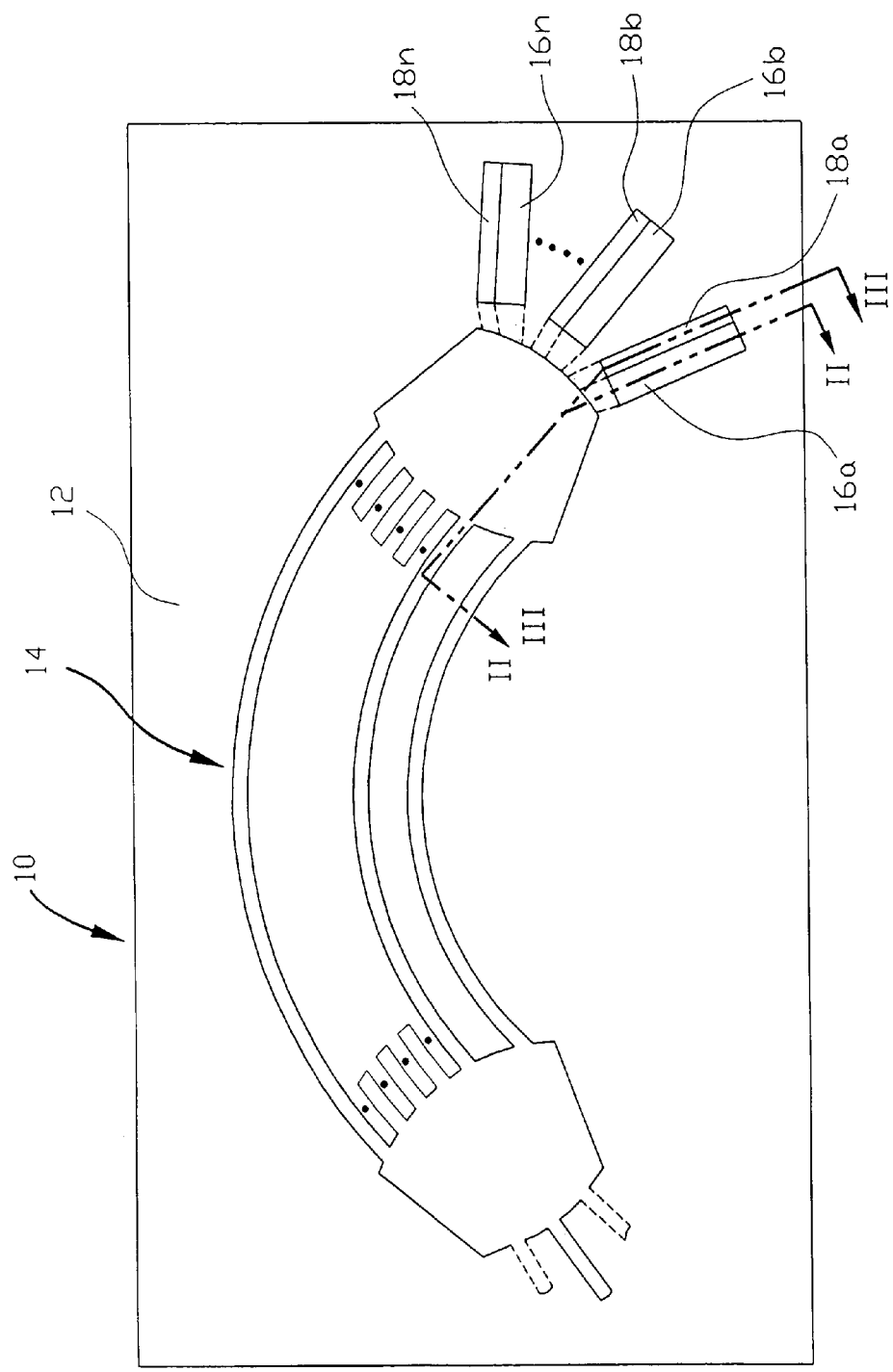
FIG. 1 is a general top view of an integrated demultiplexer/photoreceiver of the present invention.

FIGS. 1–6C—Embodiment of the Device of the Invention wherein Transparency of the Optical Signal Transmission Layer of WGR is Controlled by Selectively Doping the Multiple-Layer Structure of the WGR An integrated demultiplexer/photoreceiver of the present invention, which as a whole is designated by reference numeral 10, is shown in FIG. 1, which is a general top view of the device. It can be seen that the integrated demultiplexer/photoreceiver 10 (which hereinafter will be referred to as IDP) consists of the following three basic components formed on a common substrate 12: a waveguide grating routing (WGR) 14, an array of photodetectors 16a, 16b, . . . 16n, and an array of transistors 18a, 18b, . . . 18n located on the sides of the respective photodetectors 16a, 16b, . . . 16n.

As in any IDP, which incorporates a WGR as a demultiplexing component, the WGR 14 is used to demultiplex the incoming multiwavelength optical signal and to direct the individual optical channels to respective photodetectors 16a, 16b, . . . 16n. Photodetectors 16a, 16b, . . . 16n are used to convert optical signals received from the WGR 14 into electrical signals which, in turn, are transferred to respective transistors 18a, 18b, . . . 18n, which amplify the obtained electrical signals and transfer them to respective external data processing devices (not shown).

A distinctive feature of the entire IDP 10 of the present invention, which makes it different from known IDP devices, is that it has a substantially uniform layered structure over the entire length of the IDP 10, while the WGR portion 14 thereof is made transparent. More specifically, basic layers of all aforementioned basic components, i.e., the WGR 14, the array of photodetectors 16a, 16b, . . . 16n, and the array of transistors 18a, 18b, . . . 18n, are grown simultaneously as an integral unit, and then the WGR 14 is made transparent, while the remaining units are accomplished in accordance with their specific functions. This conception will be better understood after consideration of the ensuing detailed description of the specific embodiments given below.

Figure 2:
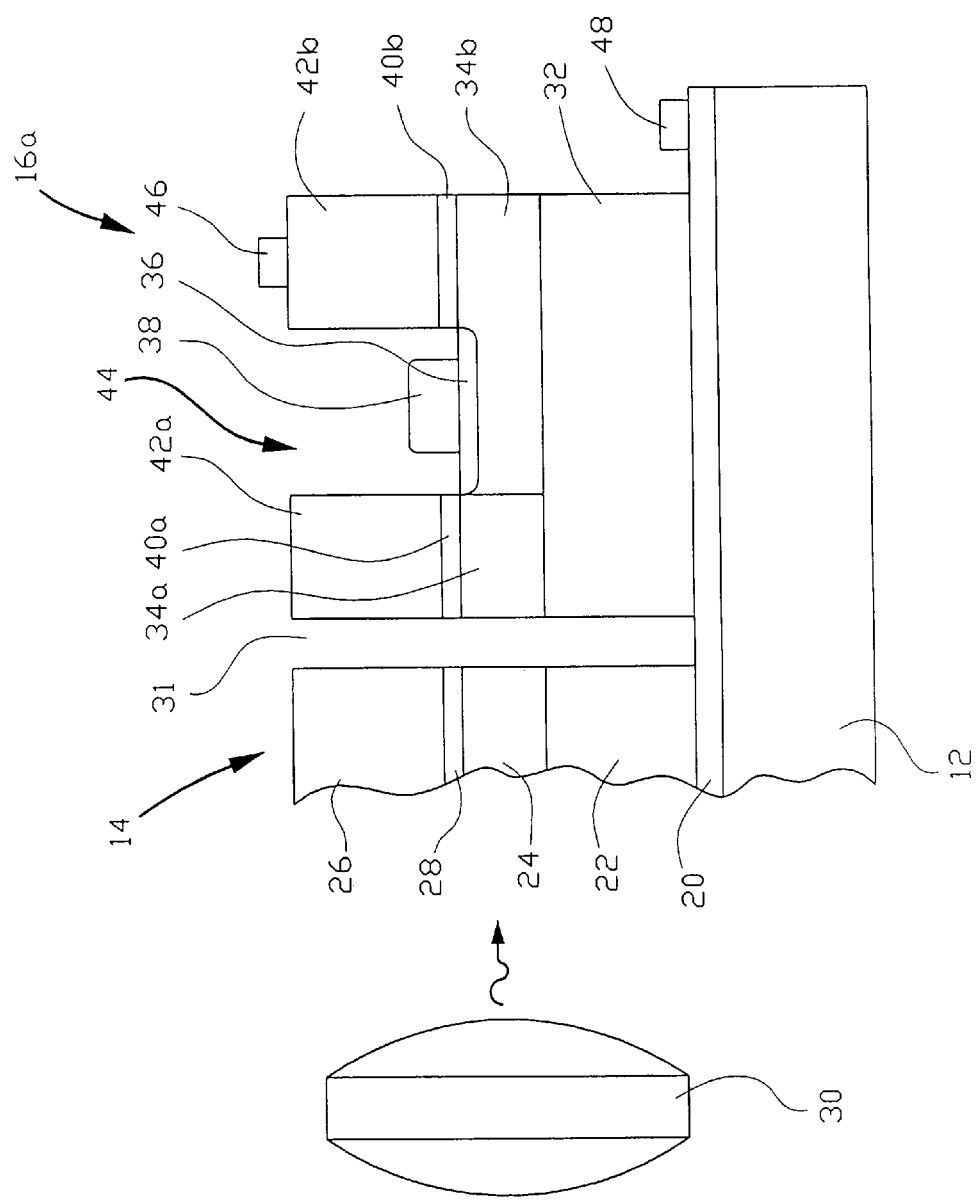
FIG. 2 is a sectional view along line II—II of FIG. 1 illustrating the structure of the waveguide grating router and a photodetector.

As can be seen from FIG. 2, which is a sectional view along line II—II of FIG. 1, the IDP 10 has the common semi-insulating substrate 12 which can be made, e.g., of indium phosphide (InP) and may have a high-doped P-type surface layer 20 made, e.g., by epitaxial growing or by ion implantation. The surface layer 20 serves for electrical isolation of components subsequently formed in the IDP structure from the substrate 12. This layer can also be used as a common ground for the aforementioned components. It can also be seen from FIG. 2 that both components shown in this drawing, i.e., the WGR 14 and the photodetector 16a (it is understood that the photodetector 16a is shown only as an example and that all other photodetectors are identical), have essentially a commonly grown layered structure which consists of the layers described below.

Individual layers of the IDP 10 will be described in the order of their growth on the substrate 12 and separately for each of aforementioned three basic components.

In the WGR 14 of the illustrated embodiment, a layer 22 is a high-doped N-type InP layer. This layer may be doped, e.g., with S or Sn, and may have a doping level of about 4 to 7 E18/ccm. This layer may have a thickness of the order of 1 to 3 μm. The layer 22 can be grown and doped in a conventional epitaxial process. If necessary the layer 22 may be made of a composition selected from the group consisting of InGaAsP and AlInGaAs.

A layer 24, which is grown on top of the layer 22, has a ternary or quaternary composition of III–V elements, such as GaInAsP. In the WGR the layer 24 functions as a light waveguide core for propagating incoming light signals towards the array of photodetectors 16a, 16b, . . . 16n. It may have a thickness of about 0.5 to 1.5 μm. In the WGR portion, this layer is a high-doped N-type layer. As will be shown later in the description of the manufacturing method, doping is carried out after the entire layered structure is commonly grown. The content of elements, which form this composition, is selected with reference to performance characteristics of photodetectors 16a, 16b, . . . 16n, as well as to InP lattice match consideration.

The next layer grown on the layer 24 is another high-doped N-type InP layer 26. In its structure, it is similar to the layer 22 described above and differs from the layer 22 in that doping of this layer 26 is carried out after the entire layered structure is commonly grown. This layer may have the same or almost the same thickness as the layer 24.

If necessary, an intermediate spacer or thin stop-etch InP layer 28 can be formed between the layers 24 and 26. The purpose of this stop-etch layer will be described in connection with the array of photodetectors.

It should be noted that the composition of the layer 24 is selected so as to lattice match this layer as close as possible to the neighboring layers 22 and 26 between which it is sandwiched. The grating portion of the WGR 14 may have different cross-sections in the direction perpendicular to the light propagation. However, the principles of the invention are applicable to any cross-sectional configuration.

Reference numeral 30 designates a light input optical device, such as a collimator lens or the like, for directing incoming communication optical signals to the WGR 10 via the waveguide core layer 24 which is shielded by the neighboring cladding layers 22 and 26.

In the context of the present invention, the term "communication optical signals" means main optical signals which either carry information or are used for control functions.

Next component of the IDP 10 of FIG. 2 in the direction of light propagation is the array of photodetectors 16a, 16b . . . 16n (FIG. 1). If necessary, for the purposes of electric isolation of this array from the neighboring WGR 14 or for providing a potential space which may be required to place an optical alignment device (not shown), a gap 31 can be formed between the WGR 14 and the array of photodetectors 16a, 16b . . . 16n.

What is shown in FIG. 2 to the right from the WGR 14, or from the gap 31, if such a gap is available, is one of photodetector, e.g., photodetector 16a that falls into the cross section along line II—II of FIG. 1. It should be noted, that all photodetectors of the array are identical.

As can be seen from FIG. 2, a part of the layered structure of the photodetector 16a is the same as the layered structure of the WGR 14. More specifically, a layer 32 is the same as the high-doped N-type InP layer 22 as it is produced in a common process of growth with the layer 22. Next layer located on the top of the layer 32 consists of two portions arranged sequentially in the direction of light propagation. The first portion 34a is the same in its doping characteristics and structure as the layer 24 of the WGR 14. The second portion 34b is an undoped or lightly doped P-type layer of GaInAsP. Both portions 34a and 34b are commonly grown together with the layer 24, and then the portion 34a is doped together with the layer 24, while the portion 34b remains undoped or is lightly doped to form a P-type layer.

The portion 34b, in turn, has a sublayer 36, which is a shallow (e.g., 0.1 to 0.3 μm) high-doped P-type sublayer. This sublayer can be formed, e.g., by ion implantation or by other diffusion method known in the art. Since the sublayer 36 is formed inside the portion 34b, it has the same structure as the portion 34b. A metal electrical contact 38 is formed on the surface of the sublayer 36, e.g., by chemical, physical vapor deposition, or by any other suitable known method.

Thin layers 40a and 40b shown in the structure of the photodetector 16a on top of the respective layers 34a and 34b are stop-etch layers of the same type as the stop-etch layer 28 of the WGR 14.

The uppermost layer of the photodetector 16a also consists of two parts 42a and 42b commonly grown with the layer 26 of the WGR 14. A gap 44 is formed, e.g., by etching, to the level of the surface of the portion 34b, and then doping of the surface region of the portion 34b is carried out to form the sublayer 36.

The portions 42a and 42b are the same in their doping and properties as the aforementioned layer 26 of the WGR 14. A metal contact 46 is formed on the top of the portion 42b.

Now functions of various layers and portions of the photodetector 16a will be described. The layers 32, portion 34a, and portion 42a altogether form a light input of the photodetector 16a. The portion 34b absorbs the light component of specific wavelength and ensures generation of electrons and holes caused by the incoming light signal. The sublayers 36 and 34b form a P-N junction. The portion 42b is a part of a conductive path for the generated photocurrent. The aforementioned P-N junction in combination with the portion 42b and with contacts 38 and 46 accomplish photoelectric conversion of the incoming optical signal into an output electrical signal (current). It should be noted that, due to the fact that the light signal enters the photodetector 16a (FIG. 1) in a lateral direction (i.e., is side illuminated), it becomes possible to reduce power losses and to achieve a higher quantum efficiency in the photodetector 16a (FIG. 1). Since in the construction shown in FIG. 2 the contact 38 is not on the path of the incoming light signal, it becomes possible to increase the contact area of this contact with the surface of the sublayer 36. This feature contributes to a decrease in conductive losses and improves efficiency of photoelectric conversion.

Reference numeral 48 designates a metal electric contact for use in conjunction with the respective transistor 18a of the transistor array.

Figure 3:
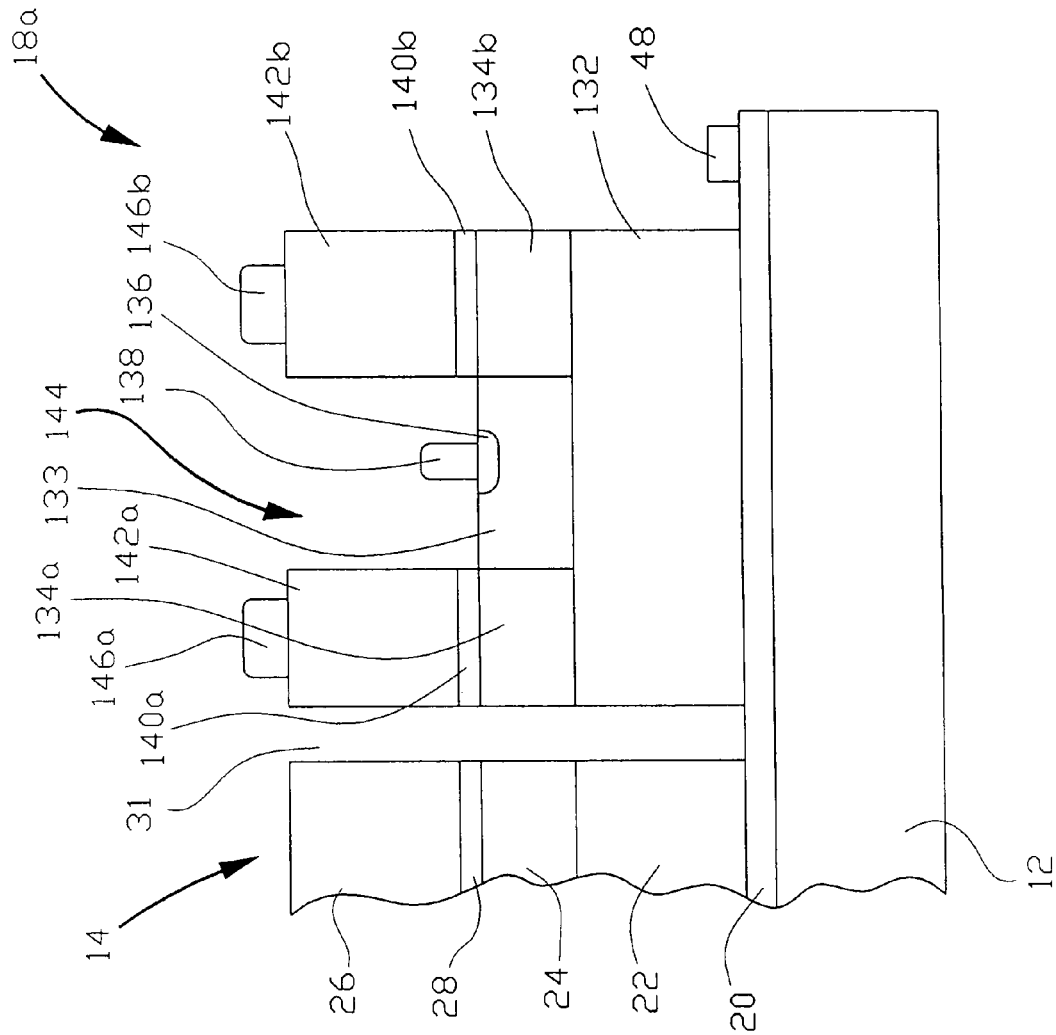
FIG. 3 is a sectional view along line III—III of FIG. 1 illustrating the structure of the waveguide grating router and a heterojunction transistor.

FIG. 3 is a sectional view along line III—III of FIG. 1 illustrating the structure of the heterojunction transistor 18a, which falls into the aforementioned sectional view. It is understood that the rest of the transistors of the array have the same structure. In this drawing, the WGR 14 is shown to illustrate that the gap 31 may exist between the output end of the WGR 14 and the array of transistors in order to disconnect them electrically. Although in FIG. 1 the photodetectors and respective transistors are shown in direct contact with each other, a gap 52 shown in FIG. 4 can be provided between these components. The rest of the structure is the same as in FIG. 1. The gap 52 can be a through gap extending down to the substrate 12, or may have a limited depth, e.g., to the sublayer 34b defined in the description of the photodetector 18a.

As can be seen from FIG. 3, a part of the layered structure of the transistor 18a is the same as the layered structure of the photodetector 16a. Therefore, structural elements of the transistor 18a, which are identical to those of the photodetector 16a, will be designated by the same reference numerals with an addition of 100. More specifically, a layer 132 is the same as the high-doped N-type InP layer 32, as it is produced in a common process of growth with the layer 22. Next layer located on the top of the layer 132 consists of three portions arranged sequentially in the direction away from WGR 14. The first portion 134a is the same in its doping characteristics and structure as the layer 24 of the WGR 14. The second portion 133 is a lightly or moderately doped P-type layer of GaInAsP. The third portion 134b is the same as the respective portion 34b of FIG. 2. All three portions 134a, 133, and 134b are commonly grown together with the layer 24, and then the portion 134a is doped together with the layer 24, while the portion 133 is additionally doped to form a P-type layer. The portion 134b remains undoped or is lightly doped to form a P-type layer.

The portion 133, in turn, has a sublayer 136, which covers a part of its surface and is a shallow (e.g., 0.1 to 0.3 μm) high-doped P-type sublayer. This sublayer can be formed, e.g., by ion implantation or by other diffusion method known in the art. The sublayer 136 can be formed simultaneously with the sublayer 36 (FIG. 2) of photodetector 16a. Since the sublayer 136 is formed inside the portion 133, it has the same structure as the portion 133. A metal electrical contact 138 is formed on the surface of the sublayer 136, e.g., by chemical, physical vapor deposition, or by any other suitable known method. The portion 134b remains the same as the portion 34b of FIG. 2.

Thin layers 140a and 140b shown in the structure of the transistor 18a on top of the respective layers 134a and 134b are stop-etch layers of the same type as the stop-etch layer 28 of the WGR 14.

The uppermost layer of the transistor 18a also consists of two parts 142a and 142b commonly grown with the layer 26 of the WGR 14. A gap 144 is formed, e.g., by etching, to the level of the surface of the portion 133, and then doping of the surface region of the portion 133 is carried out to form the sublayer 136.

The portions 142a and 142b are the same in their doping and properties as the aforementioned layer 26 of the WGR 14. Metal contacts 146a and 146b are formed on the tops of the respective portions 142a and 142b.

Now functions of various layers and portions of the transistor 18a will be described. The portion 142b in combination with the contact 146b constitute an emitter of the transistor 18a. The portions 133, 134b, the sublayer 136 in combination with the contact 138 form a base of the transistor, while the layers 142a, 134a, and 132 in combination with the contact 146a constitute a collector of the transistor. The maximum gain of the aforementioned transistor 18a is achieved by properly selecting doping levels and dimensions of the transistor layers, especially those of the base.

It can be seen from FIG. 4 that the contact 38 of the photodetector 16a is electrically connected to the contact 138 of the transistor 18a via a metal bridge 137. Similarly, the contact 46 of the photodetector 16a is electrically connected to the contact 146 of the transistor 18a via a bridge 139. The same is applicable to the layout shown in FIG. 1. These electrical contacts ensure entering of the output photocurrent of the photodetector 16a to the base of the transistor 18a with appropriate biasing of the emitter-base junction of the transistor 18a. It is understood that some other electrical connections between a photodetector and transistor can be employed utilizing the contact 48 as a common ground for both photodetectors and transistors.

It should also be noted that all respective transistor regions, e.g., the emitter, base, and collector are assumed to be additionally biased by some external sources (not shown) to ensure proper operation. Output current of the photodetector 16a serves as an input base current for the transistor thus amplifying the input signal.

Output electric signals obtained by converting optical signals into electric signals with subsequent amplification of the electrical signal are sent out from the contact 146a (a collector of the heterojunction transistor) to a respective electrical circuit (not shown) for individual data processing.

It is understood that though the entire process from acquisition of optical signals to output of the electrical signals from the contact 146a was described with reference to an individual optical channel defined by the WGR 14, photodetector 16a, and transistor 18a, the same explanation is applicable to all channels that include other individual photodetectors and transistors of respective arrays, so that multiple-channel optical input can be processed by the IDP 10 of the invention.

Figure 5B:
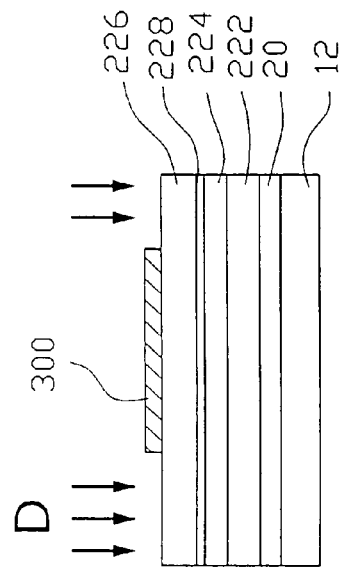
FIGS. 5A, 5B, 5C, 5D, 5E, 5F, 5G, 5H, 5I are cross sectional views illustrating sequential steps of IDP manufacturing.
Figure 5D:
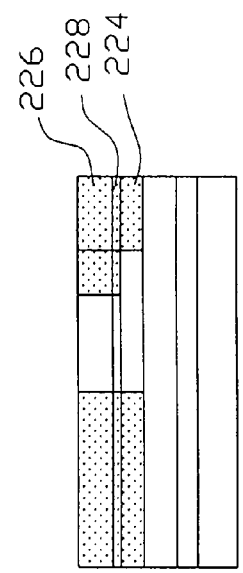

The IDP 10 of the present invention can be manufactured by the method described below with reference to FIGS. 5A, 5B . . . , which are cross sectional views illustrating sequential steps of IDP manufacturing. It should be noted that the images shown in FIGS. 5A through 5I and in FIGS. 6A to 6C are not in scale and show some elements in overlapped steps for simplicity of explanation. For example, in FIGS. 5H and 5I the electrical contacts are shown together with masks, whereas in actual steps the final contact area is formed after the mask is removed by lift-off. Furthermore, layers doped by implantation or by any other diffusion process are shaded by dots. The masks are hatched.

Figure 5A:
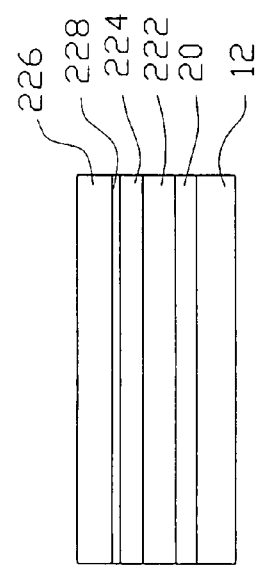
Figure 5C:
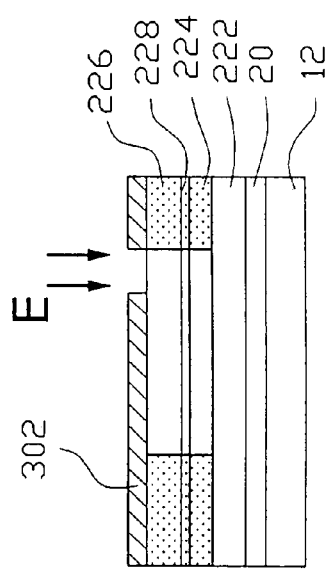
Figure 6A:
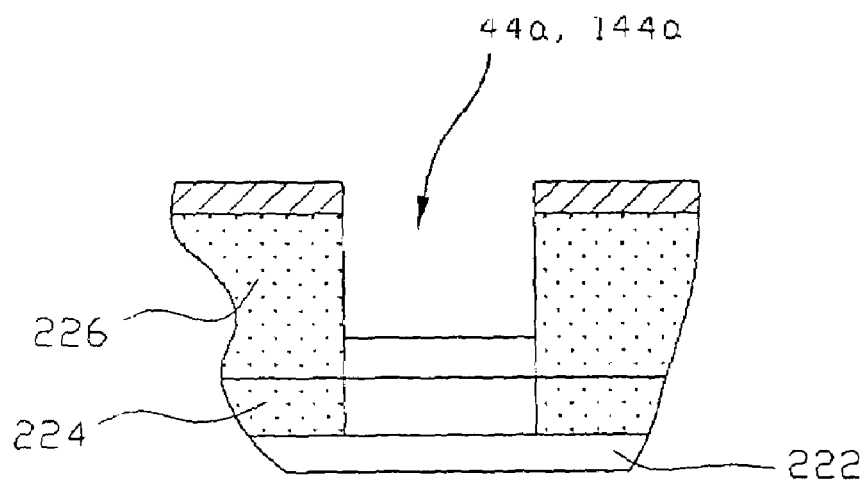
FIGS. 6A, B, and C illustrate another embodiment of the method, which relates only to the formation of some sublayers shown in FIGS. 5G and 6H.
Figure 6B:
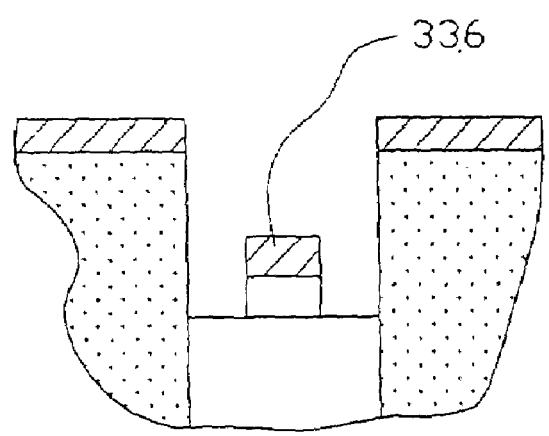
Figure 6C:
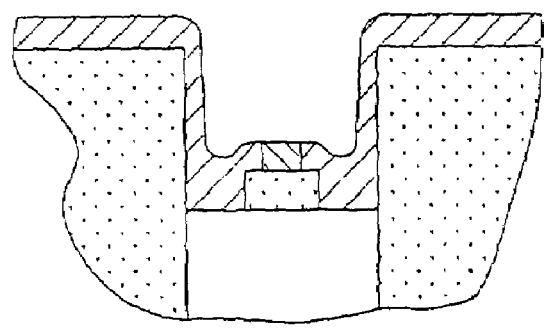

First, the common substrate 12 is made of an N-type doped or undoped InP wafer (FIG. 5A). If necessary, a high-doped P-type surface layer 20 (FIG. 5A) is made, e.g., by epitaxial growing or by ion implantation on the entire surface of the common substrate 12. The provision of the surface layer 20 is arbitrary as it is required only for N-type substrates and for specific electrical connections between the IDP components which require a common ground.

A layer 222 (FIG. 5A) is then grown over the entire surface of the layer 12 or 20, if available, e.g., by a molecular beam epitaxy (MBE) or metal organic chemical vapor deposition (MOCVD) method, as a continuous layer which is a high-doped N-type InP layer. In the course of growing, this layer is doped, e.g., with S, Sn or other suitable elements to the doping level of about 4 to 7 E18/ccm. The layer is grown to the thickness of the order of 1 to 3 µm. It should be noted that, in accordance with the present invention, after the growing the layer 222 remains intact from the viewpoint of doping and thickness.

A layer 224 is then grown, e.g., by methods mentioned above, over the entire surface of the layer 222. The layer 224 consists of III–V elements as a ternary or a quaternary composition, such as GaInAsP. This layer is grown undoped to the thickness of about 0.5 to 1.5 µm. The content of elements which form this composition is selected with reference to performance characteristics of the photodetectors 16a, 16b, . . . 16n, as well as to InP lattice match consideration.

If necessary, a very thin stop-etch InP layer 228 can be optionally formed on the top of the layer 224. The next layer grown on the top of the layer 224 or 228, if available, is another continuous N-type InP layer 226. In its structure, it is similar to the layer 222 described above.

The surface areas of the layer 226, which will later correspond to the gap 44 and the to layer 42b of FIG. 2 (as well as to the gap 144 and the layer 142b of FIG. 3), are protected by a masking layer 300 applied by means of a conventional photolithography technique. The exposed areas are doped, e.g., by ion implantation or radiation doping methods. The step of doping is shown by arrows D in FIG. 5B. Doping is carried out to the level of interface or slightly below the interface between the layers 222 and 224. As a result of this doping, the doped area, which is hatched in FIG. 5C, becomes transparent to optical signals S entering the IDP 10 (FIG. 2). The masking layer 300 is removed and the surface of the layer 226 is protected by another mask 302 which leaves unprotected only a window 304 corresponding to the position of the layers 42b (FIG. 2) and 142b (FIG. 3). The exposed area is doped, e.g., by ion implantation or radiation doping methods. The step of doping is shown by arrows E in FIG. 5C. Doping is carried out to the level below the interface between the layers 224 and 226, or 224 and 228, if available. However, the depth of this doping should not reach the top of the layer 222, in order to prevent short-circuiting of the emitter and collector areas of the transistors in the transistor array shown in FIGS. 1 and 3.

Furthermore, doping is carried out to the same degree as previously doped layers 226, 228, 224 (FIG. 5B).

Figure 5E:
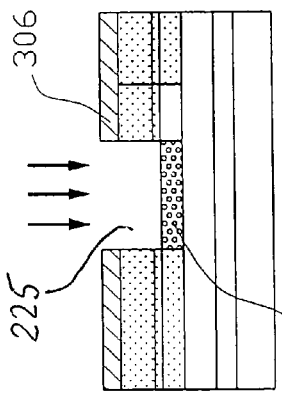

In the step shown in FIG. 5E, the entire surface of the layered structure of FIG. 5E, except for the area corresponding to the gaps 44 and 144 in FIGS. 2 and 3, respectively, are masked with a mask 306, and the unmasked area is etched off down to the layer 224. As a result, a portion 225 is formed.

Figure 5F:
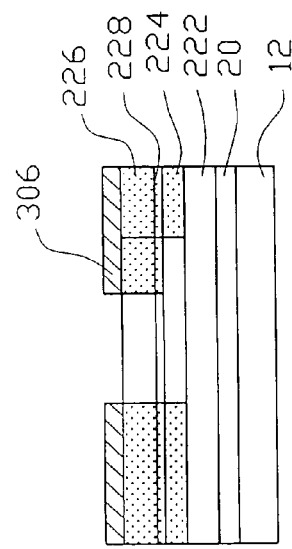

The mask 306 is left intact for use in the next step shown in FIG. 5F, where an operation of doping of the area corresponding to the portion 133 (FIG. 3) is carried out. It should be noted that this operation is performed only for the array of transistors shown in FIGS. 1 and 3, while the area corresponding to respective portion 34b of FIG. 2 remains intact, i.e., undoped. As a result, a doped portion 133 of FIG. 3 is formed. Doping is carried out by ion implantation or radiation doping.

Figure 5G:
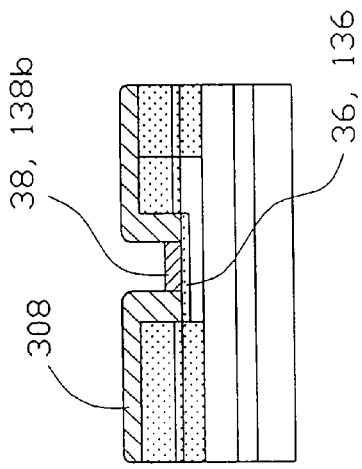

As has been mentioned, the area corresponding to the respective portion 34b of FIG. 2 remains intact. FIG. 5G is a longitudinal section of the layered structure of FIG. 2 treated to the stage of FIG. 5F. At this stage the shallow sublayer 36 (FIG. 2) of photodetector 16a is formed, e.g., by ion implantation or by other diffusion method known in the art. At the same time, the sublayer 136 (FIG. 3) is formed. Both sublayers 36 and 136 are formed with the use of a mask 307. The remaining part of the portion 225 defines the portion 34b (FIG. 2) and the portion 134b (FIG. 3). FIG. 5G corresponds only to the cross section of the photodetector portion. In the transistor portion (not shown), the sublayer 136 will be different in size and location.

Figure 5H:
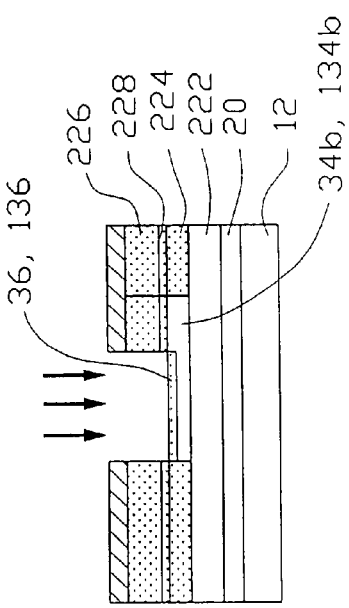

FIG. 5H illustrates formation of the metal electrical contacts 38 (FIG. 2) and 138 (FIG. 3). For this purpose the entire surface of the layered structure of FIG. 5G, except for the areas corresponding to metal electrical contacts 38 and 138, is masked with a mask 308, and the contacts are formed by conventional metallization processes with the use of chemical, physical vapor deposition, or any other suitable known method.

Figure 5I:
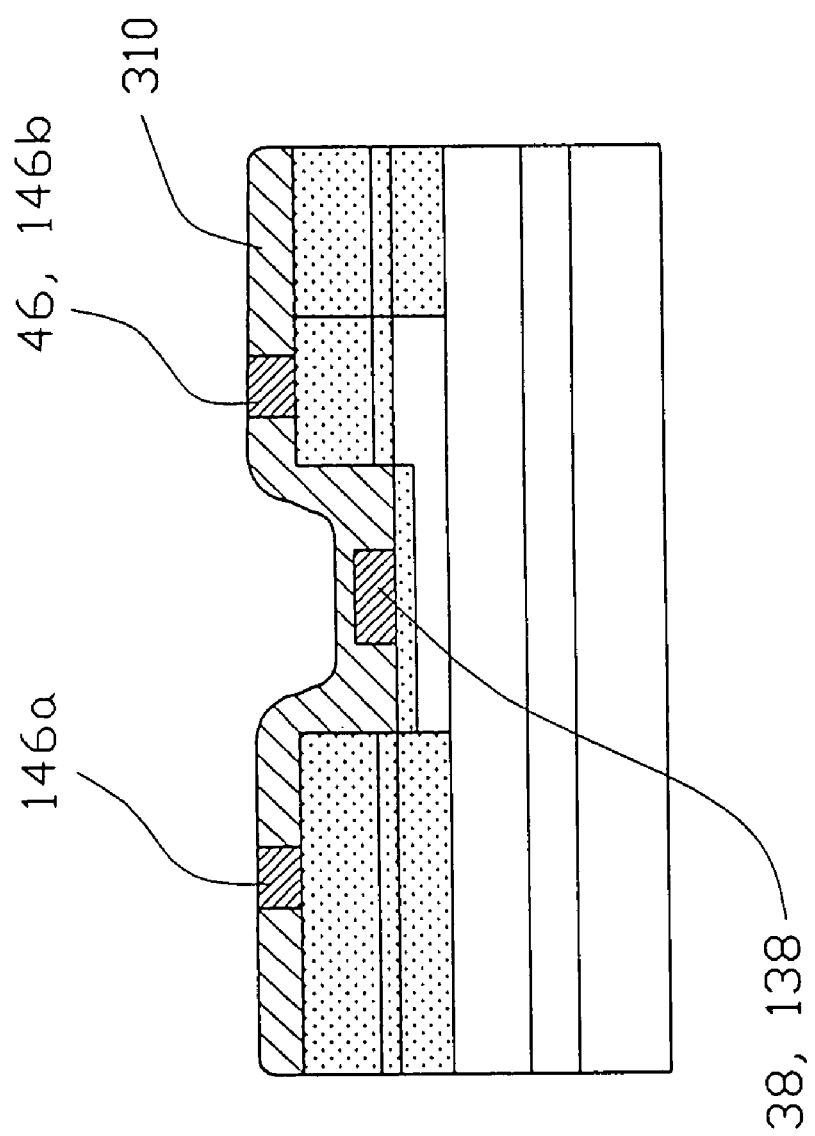

The mask 308 is removed, and the stage in which contacts 46 (FIG. 2), 146a, and 146b (FIG. 3) are formed is carried out as shown in FIG. 5I. For this purpose, the entire surface of the layered structure of FIG. 5H, except for the areas corresponding to metal electrical contacts 46 (FIG. 2) and 146a and 146b (FIG. 3), is masked with a mask 310, and the contacts are formed by conventional metallization processes with the use of chemical, physical vapor deposition, or any other suitable known method. The mask 310 is then removed.

The gaps 31 (FIGS. 2 and 3) and gap 52 (FIG. 4) can be formed, e.g., by reactive ion etching or by any other suitable technique known in the art. These gaps can be formed, e.g., after the stage shown in FIG. 5E.

The connecting bridges 137 and 139 (FIG. 4) can be formed at the metallization stage shown in FIG. 5I.

FIGS. 6A, B, and C illustrate another embodiment of the method, which relates only to the step of formation of the sublayers 36 and 136 shown in FIG. 5G. More specifically, instead of forming a shallow sublayers 36 and 136, it is possible to etch the spaces 44 and 144 not to the entire depth but leaving a certain thickness intact. As a result, gaps 44a and 144a are formed. This is shown in FIG. 6A. At the next step shown in FIG. 6B, the bottom of the gap 44a is masked (along with the top surfaces of the layered structure) in the area where a raised portion 336 is to be formed, and then the unprotected area of the gap's bottom is etched off to leave the raised portion 336. Since this raised portion 336 is still undoped, it should be doped to form a heavily doped P-type layer of InP (this step is not shown and can be carried out similar to the process shown in FIGS. 5C and 5D). The step described with reference to FIG. 6C is a metallization process identical to that described in connection with FIG. 5H. The subsequent manufacturing processes are the same as in the previous embodiments.

The embodiment shown in FIGS. 6A, B, and C is advantageous in that it provides a low-leakage heterojunction, instead of a diffused or implanted P-N junction, in the working zone of the photodetectors and the transistors.

Figure 7:
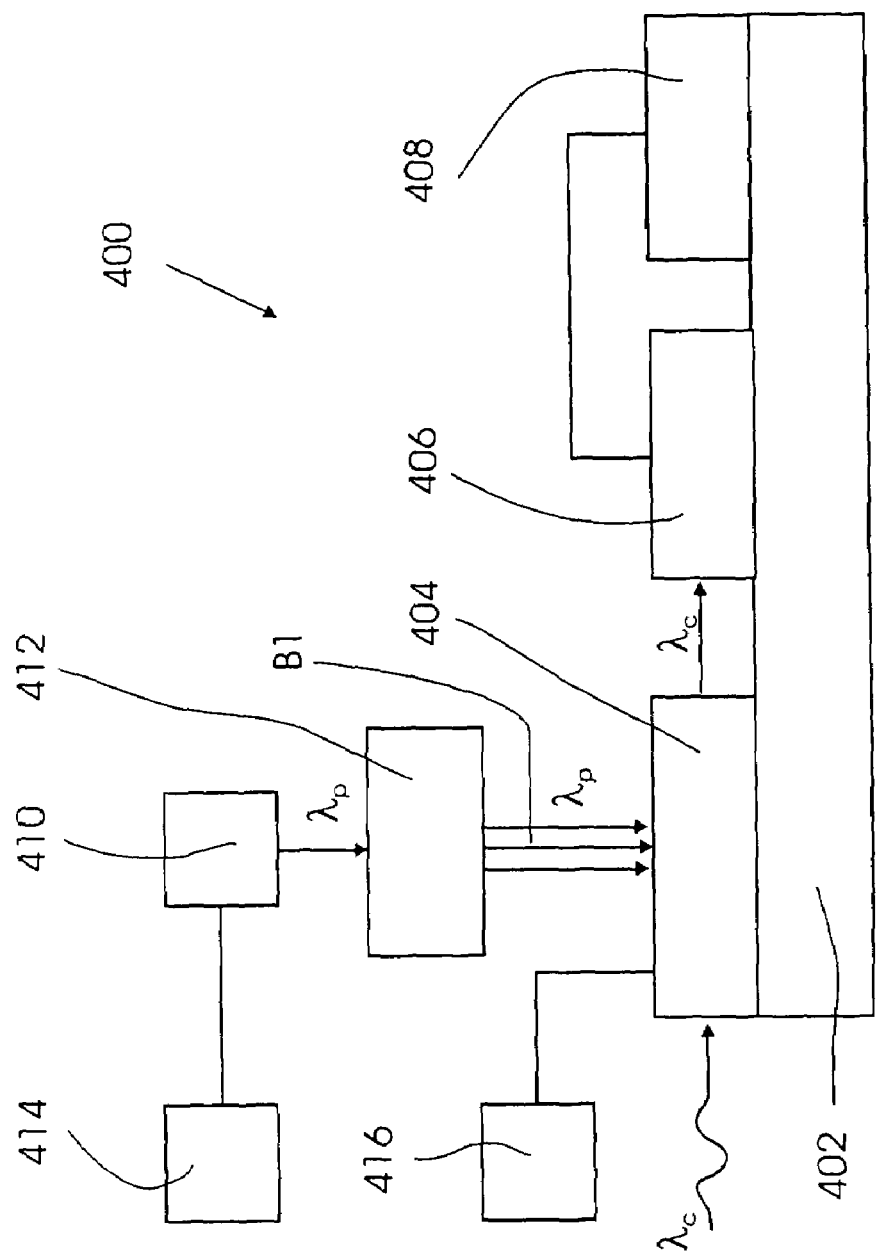
FIG. 7 is a schematic view of the integrated demultiplexer/photoreceiver made in accordance with another embodiment of the invention, wherein control of transparency of the optical signal transmission layer of WGR is provided by means of electrical bias and optical pumping.
Figure 8:
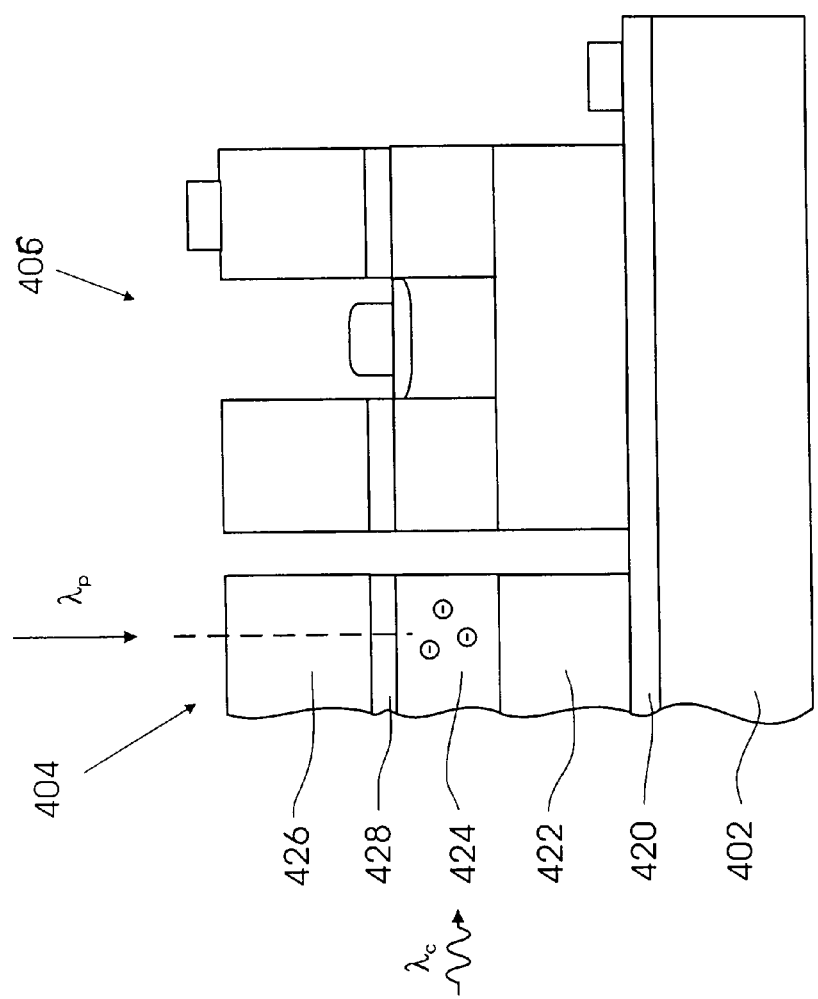
FIG. 8 is a view similar to FIG. 2 for the demultiplexer/photoreceiver of FIG. 7.
Figure 9:
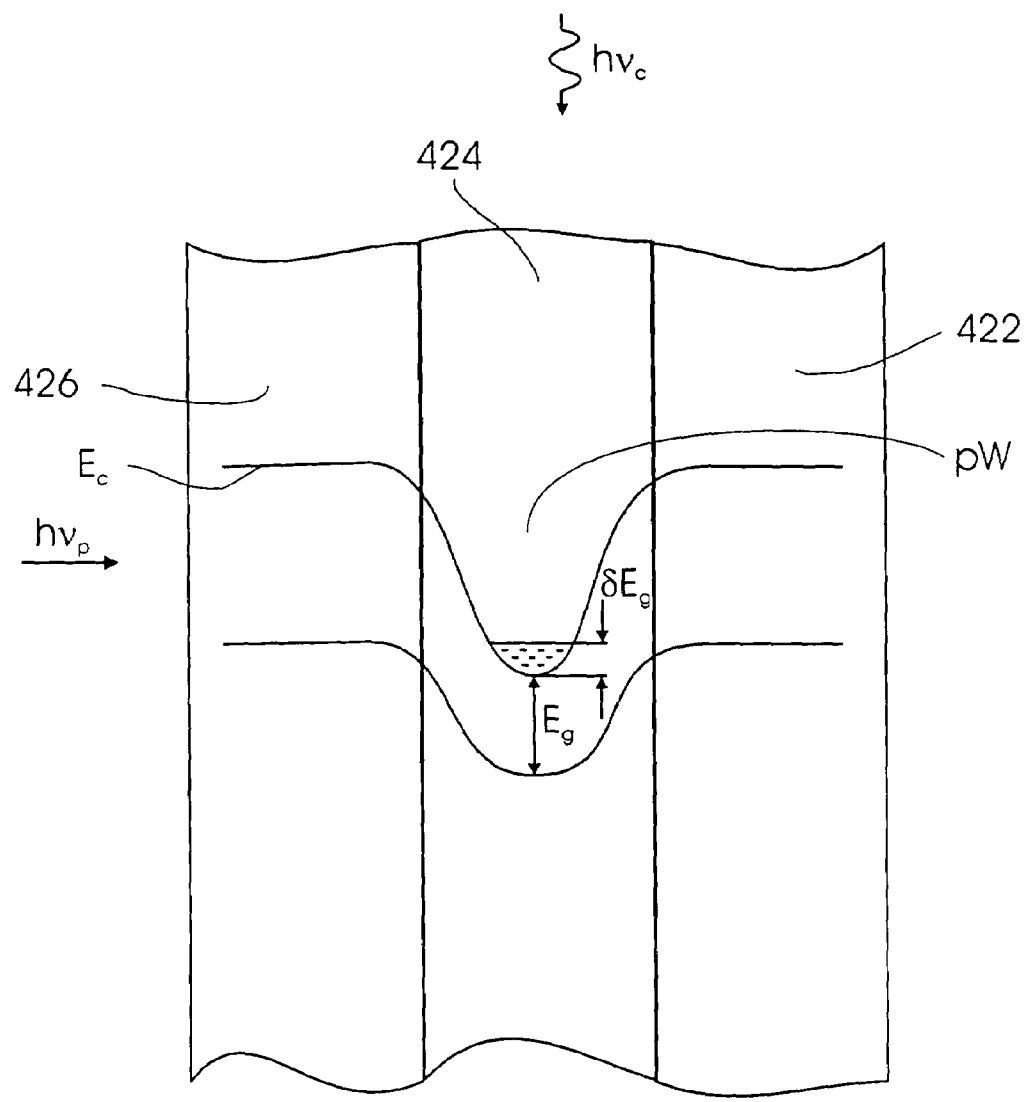
FIG. 9 is a band diagram of the WGR of FIG. 7 with optical excitation and electrical biasing for controlling transparency to optical communication signals.

FIGS. 7–9—Embodiment of the Device of the Invention wherein Transparency of the Optical Signal Transmission Layer of Light Transmitting or Controlling Device is Controlled by Utilizing Electrical Bias and Optical Pumping FIG. 7 is a general schematic view of the integrated demultiplexer/photoreceiver of the invention made in accordance with another embodiment, wherein transparency in the optical signal transmission layer of WGR is controlled by utilizing electrical bias and optical pumping. Although the embodiment of FIGS. 7–9 will be illustrated with reference to an integrated demultiplexer/photoreceiver (IDP), it is understood that the principle of the device and method of this embodiment are equally applicable to optical signal control devices such as optical switches, light modulators, and optical memory cells or devices. Therefore in the context of the present invention, the term "demultiplexer/photoreceiver" covers all other optical signal transmitting and controlling devices where transparency of the light transmission layer can be controlled by optical pumping and electrical bias.

The apparatus of the invention, which in general is designated by reference numeral 400, consists of a common substrate 402 which supports three sequentially arranged basic components: a waveguide grating router (WGR) 404, a unit 406 with an array of photodetectors, and a unit 408 with an array of heterojunction transistors. Similar to the embodiment shown in FIGS. 1–6C, all layers of all three components 404, 406, and 408 are grown together in a common epitaxial process, and then each of the components is individually patterned in accordance with its function which will be described in detail below. The integrated demultiplexer/photoreceiver 400 of this embodiment also contains: a light pumping source 410, e.g., a laser diode controlled by a laser diode driver 414 and operating on a wavelength $\lambda_p$, e.g., within the range of 810 to 980 nm; a beam shaper 412; and a voltage source 416. The function of the beam shaper 412 is to provide uniform distribution of light intensity over the cross-section of a pumping optical beam B1 emitted from the laser diode 410. The beam shaper 412 is a commercially available device produced, e.g., by Advanced Microoptical Systems, GmbH, Saarbrüken, Germany. The function of the voltage source 416 is to apply a bias voltage to the layers of the WGR 404 as will be explained later.

In FIG. 7, $\lambda_p$ designates the wavelength of the pumping light generated by the laser diode 410, and $\lambda_c$ designates the wavelengths of the communication light signals that enter the WGR 404 from an external source, e.g., through an optical fiber communication channel (not shown) and that carry information and pass through the WGR 404 to the photodetectors 406.

FIG. 8 is a view similar to FIG. 2 illustrating the structure of the WGR 404 and the individual photodetector 406 in the demultiplexer/photoreceiver 400. The WGR 404 and photodetectors 406 have the same layer structure and consists of a common semi-insulating substrate 402 which can be made, e.g., of indium phosphide (InP) and may have a high-doped surface layer 420 made, e.g., by epitaxial growing and ion implantation. The surface layer 420 serves for electrical isolation of components subsequently formed in the IDP structure from the substrate 402.

The next layer grown on the layer 420 is a high-doped P$^+$-InGaAsP layer 422. This layer is a high-doped P$^+$-InGaAsP layer doped, e.g., with Be, Zn and may have a doping level $n_1$ of about 4 to 7 E18/ccm. This layer may have a thickness of the order of 1 to 3 μm. The layer 422 can be grown and doped in a conventional process.

A layer 424, which is located on the top of the layer 422, has a ternary or quaternary composition of III–V elements, such as InGaAs or InGaAsP. In the WGR the layer 424 functions as a light waveguide core for propagating incoming light signals $\lambda_c$ towards the array of photodetectors, such as a photodetector 406 shown in FIGS. 7 and 8. In the WGR portion 404, this layer is a low doped N-type layer. In contrast to the embodiment shown in FIGS. 1–6C, this layer is not subjected to additional doping that in the previous embodiment was required for control of transparency of this layer. The content of elements which form the composition of this layer is selected with reference to performance characteristics of photodetectors 406, as well as to InP lattice match consideration. For example, for use in telecommunication systems operating on the wavelength of about 1550 nm, this layer may have the following characteristics: ratio of element contents in the stechiometry of the composition InGaAs: 0.53 (In): 0.47 (Ga); a thickness of 0.3 to 1.5 μm; and the doping level $n_2$ of about 3–5 E15/ccm. Under these conditions, the width of the energy gap $Eg_2$ should be equal to about 0.75 eV. The materials for doping may comprise the elements selected from Te, Sn, Se.

The next layer 426 (and the optional layer 428) may have a structure similar to the layer 422. The layer 426 is a high-doped P$^+$-InGaAsP layer doped, e.g., with Be, Zn and may have a doping level $n_1$ of about 4 to 7 E18/ccm. This layer may have a thickness of the order of 1 to 3 μm. The layer 426 can be grown and doped in a conventional process. An essential feature of the layer 426 is the width of the energy gap $Eg_1$ which is defined by the layer composition and which, for the example given above, is typically within the range of 1.28–1.34 eV. For apply of the bias voltage, the layers 422 and 426 are provided with electrical contacts (not shown).

Next component of the apparatus 400 of FIG. 7 in the direction of light propagation is the array of photodetectors, such as the photodetector 406 (FIG. 8) which may be the same as in the embodiment of FIGS. 1–6C, except for the fact that the layers of the photodetector 406 are doped so as to match the doping type and density in the layered structure of the above-described WGR unit 404, which is automatically achieved by the growing all layers of IDP basic components 404, 406 and 408 altogether.

It is understood that if $\lambda_p$ of the pumping light has a value, e.g., of 980 nm, the light photon energy $h\nu_p$ corresponding to such light will be equal to 1.26 eV. This light can pass to the optical signal transmission layer 424 (FIG. 8) through the layers 426 (and 428, which is optional and may have the same function as the layer 28 of the embodiment shown in FIG. 2), without noticeable absorption in the layers 426 (and 428) and should be absorbed in the layer 424. Absorption of the pumping-light photons by the optical signal transmission layer 424 is accompanied by the intense free electron generation in the layer 424. Since these electrons can diffuse out from the layer 424, where they have been generated, to the adjacent (cladding) layers 422 and 426, in order to use these electrons they have to be confined inside the layer 424. In the embodiment of FIGS. 7–10 this is achieved by applying a bias voltage from the voltage source 416 (FIG. 7) to the layers 422 and 426 with respect to the layer 424. This phenomenon, which is used to control transparency of the optical signal transmission layer 424, will now be described in more detail.

In all cases transparency modulation can be achieved by significantly enhancing electron density in the optical signal transmission layer 424 of the WGR 404 that results in filling up quantum states in the bottom part of the conduction band $E_c$ (FIG. 9 is a band diagram of the WGR 404 with optical excitation), thus causing an efficient semiconductor energy gap Eg to become wider as viewed by the incident photons of the energy $h\nu_c$, shown in FIG. 9 (Burstein-Moss effect). Assuming that the band gap increase over the full area of the optical signal transmission layer 424 is δEg, the light transmission layer 424 becomes fully or partially transparent to the incoming light $\lambda_c$ that has the equivalent photon energy $h\nu_c$<Eg+δEg. By choosing the starting material composition of the optical signal transmission layer 424 with Eg<$h\nu_c$, the conditions for transmitting (hence demultiplexing the communication light) through the optical signal transmission layer 424 are met, followed by the full absorption of the photons coming from the laser diode 410 (FIG. 7). This ensures an effective operation of the WGR 404 and photodetectors 406 in the spectral range defined by the following condition: Eg<$h\nu_c$<Eg+δEg.

A potential problem with the above-described channel modulation transparency control method is that, as has been mentioned above, the excessive electrons, generated in the layer 424 (that has to pass the communication light signals $\lambda_c$) by the external optical excitation (pump) with the light $\lambda_p$, may diffuse out of the layer 424 to the adjacent cladding layers 422 and 426 thus causing a reduction in the effective energy gap (Eg+δEg) along with transparency drop in the layer 424. To prevent that from happening, the aforementioned bias voltage from the voltage source 416 (FIG. 7) can be applied between the P$^+$ cladding layers 422, 426 and the N$^-$ core layer, i.e., the optical signal transmission layer 424. The voltage is applied in such a way that both P$^+$N junctions are reverse biased which results in the formation of a potential well PW in the layer 424 (FIG. 9). Extra electrons generated by the pump radiation from laser diode 410 will be then confined in the potential well PW resulting in stable and efficient transparency increase in the optical signal transmission layer 424.

The above description related to the WGR portion 404 of the integrated demultiplexer/photoreceiver 400 made in accordance with the second embodiment of the invention. The remaining parts of the integrated demultiplexer/photoreceiver 400, i.e., the photodetectors 406 (FIGS. 7 and 8), and the heterojunction transistors 408 (FIG. 7), are the same as they are in the integrated demultiplexer/photoreceiver 10 of the first embodiment (FIG. 2) with appropriate matching between the layers in the WGR 404, photodetector unit 406, and the transistor unit 408. Therefore description of these parts is omitted.

An advantage of the apparatus of the second embodiment shown in FIGS. 7–9 is that it can function not only as an integrated demultiplexer/photoreceiver, but also as a light switch device. For example, by adjusting the intensity of optical pumping with the use of the laser diode 410 via its driver 414 and/or by choosing an appropriate bias from the voltage source 416, it becomes possible to cut off the passage of the light signal of one wavelength while allowing transmission of light signals of another wavelength.

Figure 10:
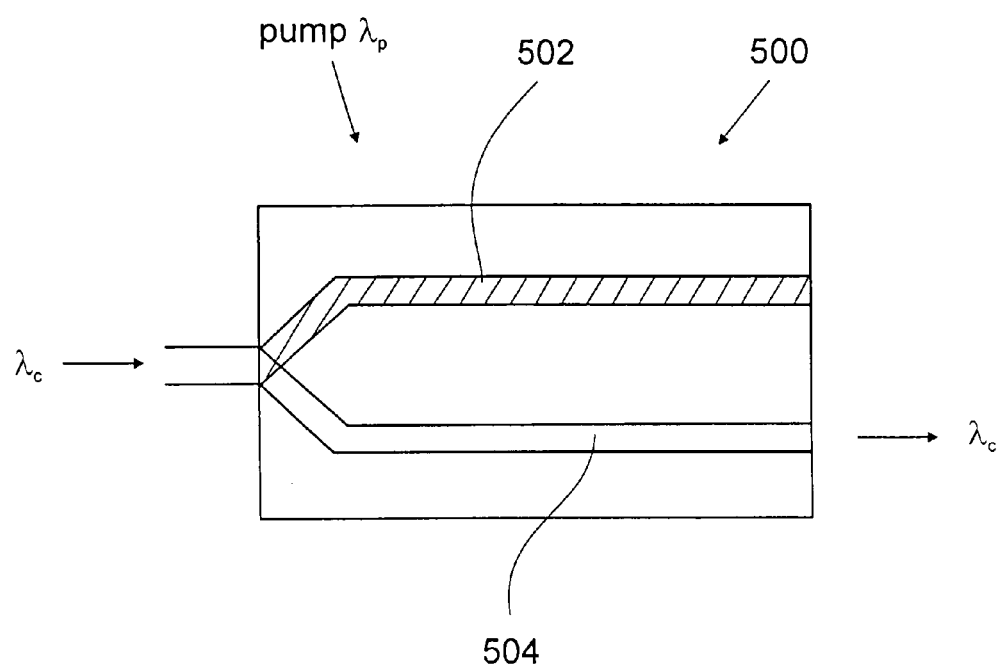
FIG. 10 is a schematic top view on the apparatus of the second embodiment (FIGS. 7–9) operating as an optical switch.

FIG. 10 is a schematic top view on the apparatus of the second embodiment (FIGS. 7–9) operating as an optical signal switch. The apparatus, which is designated as a whole by reference numeral 500, has a multiple-layer structure of the same type as described above. Depending on the transparency condition in the layer 424 (which is not shown in FIG. 10), the optical signals can be switched between a waveguide channels 502 and 504. The aforementioned channels 502 and 504 correspond to those areas which are subjected to selective optical pumping.

Thus, it has been shown that the present invention provides an integrated demultiplexer/photoreceiver for optical networks and optical interconnection devices which is simple in construction, inexpensive and simple to manufacture, can be produced in a single manufacturing process for all basic components, is characterized by reduced optical losses, and facilitates optical alignment. The invention also provides a method for controlling transparency of the optical signal transmission layer of WGR by selectively doping the multiple-layer structure. The apparatus and method of the invention may provide control of transparency in the optical signal transmission layer of the light transmitting devices by utilizing electrical bias and optical pumping with the use of a light pumping source operating on a predetermined wavelength.

Although the invention was described with reference to specific embodiments, it is understood that these embodiments should not be construed as limiting the scope of application of the invention. Therefore, any changes in the materials, shapes, dimensions, compositions, doping levels, etc., are possible, provided they do not depart from the scope of the patent claims. For example, the gap between the WGR portion and the photodetector portion may vary in depth and width, or may not exist at all. The structure was shown with etch-stop layers, which also may not be grown. The contacts 46 may be formed on the top of the portion 42a instead of 42b. Although the device was illustrated in the form of an embodiment only with three layers, the number of layers may be greater than three, provided the device includes the three basic layers mentioned and described in the applications. Light sources other than a laser diode, e.g., an LED, a solid-state laser, or the like, can be used for optical pumping. Light of wavelengths different from those indicated can be used. It is understood that communication light signals of different wavelength will require pumping with light having wavelength specifically match to the energy gap of the second doped (core) layer of the waveguide grating router that is chosen to match given communication light signal.

The invention claimed is:

1. An integrated demultiplexer/photoreceiver for optical networks and optical interconnection devices intended for receiving, demultiplexing, and converting communication optical signals into electrical communication signals, said integrated demultiplexer/photoreceiver comprising:
   a common substrate of a semiconductor material;
   three basic components comprising a waveguide grating router which has waveguide portions and receives said communication optical signals, an array of individual photodetectors, and an array of individual heterojunction transistors located on said common substrate, said waveguide grating router, said array of photodetectors and said array of individual heterojunction transistors being arranged sequentially one after another;
   each of said waveguide grating router, said array of photodetectors, and said array of heterojunction transistors having identical layer structure that consists of at least a first doped basic layer, a second doped basic layer which has a portion transparent to said communication optical signals only in said waveguide grating router, and a third doped basic layer which is partially etched down to said second doped basic layer;
   said first doped basic layer in all said three basic components having the same chemical composition and the same doping and is located on said common substrate;
   said third doped basic layer having in all said three basic components having the same chemical composition and the same doping, said second doped basic layer being sandwiched between said first doped basic layer and said third doped basic layer.

2. The integrated demultiplexer/photoreceiver of claim 1, wherein said portion transparent to said communication optical signals is a heavily doped N-type layer.

3. The integrated demultiplexer/photoreceiver of claim 2, wherein a composition of said portion transparent to said communication optical signals is selected from a group consisting of a ternary III–V composition and a quaternary III–V composition.

4. The integrated demultiplexer/photoreceiver of claim 3, wherein said first doped basic layer and said third doped basic layer are the same.

5. The integrated demultiplexer/photoreceiver of claim 1, wherein said first doped basic layer and said third doped basic layer are the same and are heavily doped N-type layers.

6. The integrated demultiplexer/photoreceiver of claim 5, wherein said first doped basic layer and said third doped basic layer are made of a composition selected from the group consisting of InP, InGaAsP, and AlInGaAs.

7. The integrated demultiplexer/photoreceiver of claim 1, wherein in each of said individual photodetectors, a part of said second doped basic layer, other than said portion transparent to said communication optical signals is selected from the group consisting of an undoped P-type layer and a lightly doped P-type layer.

8. The integrated demultiplexer/photoreceiver of claim 7, wherein said part other than said portion transparent to said communication optical signals has a composition selected from a group consisting of a ternary III–V composition and a quaternary III–V composition.

9. The integrated demultiplexer/photoreceiver of claim 1, wherein said second doped basic layer is made of GaInAsP.

10. The integrated demultiplexer/photoreceiver of claim 9, which has a first shallow doped sublayer in a part of said second doped basic layer, other than said portion transparent to said communication optical signals.

11. The integrated demultiplexer/photoreceiver of claim 10, wherein said first shallow doped sublayer is a heavily doped P-type sublayer.

12. The integrated demultiplexer/photoreceiver of claim 11, wherein said first shallow doped sublayer has a first metal contact formed on the surface of said first shallow doped sublayer.

13. The integrated demultiplexer/photoreceiver of claim 12, wherein a common gap is formed in said third doped basic layer in each of said individual photodetectors and in each of said individual heterojunction transistors, said first shallow doped sublayer with said first metal contact being located in said common gap.

14. The integrated demultiplexer/photoreceiver of claim 13, wherein a second metal contact is formed on said third doped basic layer.

15. The integrated demultiplexer/photoreceiver of claim 14, wherein in each of said individual heterojunction transistors, a part of said second doped basic layer, which is located beneath said common gap, is made of a material selected from the group consisting of a lightly doped P-type material and a moderately doped P-type material.

16. The integrated demultiplexer/photoreceiver of claim 15, wherein said part of said second doped basic layer, which is located beneath said common gap, has a composition selected from a group consisting of a ternary III–V composition and a quaternary III–V composition.

17. The integrated demultiplexer/photoreceiver of claim 16, wherein said second shallow doped sublayer has a third metal contact formed on the surface of said second shallow doped sublayer.

18. The integrated demultiplexer/photoreceiver of claim 17, wherein a fourth metal contact and a fifth metal contact are formed on said third doped basic layer on both sides of said common gap.

19. The integrated demultiplexer/photoreceiver of claim 1, wherein a stop-etch layer is formed between said second doped basic layer and said third doped basic layer in all said basic components.

20. The integrated demultiplexer/photoreceiver of claim 1, further comprising: electrical bias means for application of voltage to said layered structure; and optical pumping means for generating a pumping light with a wavelength capable of passing through said third doped basic layer to said second doped basic layer and being absorbed in said second doped basic layer for controlling transparency of said second doped basic layer to said communication optical signals.

21. The integrated demultiplexer/photoreceiver of claim 20, wherein said first doped layer and said third doped layer are substantially similar and comprise a doped P-layers made of a composition selected from InGaAsP and InAlGaAs and doped with a material selected from the group consisting of Be, Zn, C with the doping level within the range from 4 to 7 E18/ccm.

22. The integrated demultiplexer/photoreceiver of claim 21, wherein said first doped layer and said third doped layer each has a thickness from 1.0 μm to 3.5 μm.

23. The integrated demultiplexer/photoreceiver of claim 22, wherein said second doped basic layer has a composition selected from a ternary III–V composition and a quaternary III–V composition, said second doped basic layer having a thickness within the range of 0.3 μm to 1.5 μm.

24. The integrated demultiplexer/photoreceiver of claim 23, where said ternary composition is InGaAs.

25. The integrated demultiplexer/photoreceiver of claim 24, where said quaternary composition is InGaAsP.

26. The integrated demultiplexer/photoreceiver of claim 25, where said optical communication signals have a first plurality of wavelengths, said pumping light has a second wavelength, said second wavelength being shorter than each wavelength of said first plurality of wavelengths.

27. A method of controlling transparency of an optical signal transmission layer in an integrated demultiplexer/photoreceiver for optical networks and optical interconnection devices intended for receiving, demultiplexing, and converting communication optical signals into electrical communication signals, said method comprising the steps of:

providing an integrated demultiplexer/photoreceiver comprising:
  a common substrate of a semiconductor material;
  three basic components comprising a waveguide grating router which has waveguide portion and receives said communication optical signals, an array of individual photodetectors, and an array of individual heterojunction transistors located on said common substrate, said waveguide grating router and said array of photodetectors being arranged sequentially one after another;
  each of said waveguide grating router, said array of photodetectors, and said array of heterojunction transistors having identical layered structure that consists of at least a first doped basic layer, a second doped basic layer which has a portion transparent to said communication optical signals only in said waveguide grating router, and a third doped basic layer which is partially etched down to said second doped basic layer;
  said first doped basic layer in all said three basic components having the same chemical composition and the same doping and is located on said common substrate;
  said third doped basic layer having in all said three basic components having the same chemical composition and the same doping, said second doped basic layer being sandwiched between said first doped basic layer and said third doped basic layer;
said method further comprising the steps of:
  transmitting said communication optical signals through said optical signal transmission layer; and
  controlling transparency of said optical signal transmission layer by illuminating said optical signal transmitting layer with said pumping light.

28. The method of claim 27, further comprising the steps of:
  providing said optical network and/or optical interconnection device with a bias voltage source; and
  further controlling said transparency by applying a bias voltage to at least one of said first doped basic layer and said second doped basic layer.

29. The method of claim 28, wherein said pumping light source comprises a laser diode.

* * * * *